United States Patent Office 3,281,426
Patented Oct. 25, 1966

3,281,426
PERFLUOROALKYLATED PHTHALIC ANHYDRIDE, COPPER PHTHALOCYANINE AND THEIR PREPARATION
George Van Dyke Tiers, St. Paul, Minn., assignor to Minnesota Mining and Manufacturing Company, St. Paul, Minn., a corporation of Delaware
No Drawing. Filed May 1, 1961, Ser. No. 106,537
10 Claims. (Cl. 260—314.5)

This application is a continuation-in-part of my copending application Serial Number 528,126, filed August 12, 1955, now abandoned.

This invention relates to a new and useful process of perfluoroalkylating aromatic compounds whereby one or more perfluoroalkyl chains become attached to an aromatic nucleus, and to certain novel perfluoroalkylated aromatic compounds made by the process.

It is an object of this invention to provide aromatic compounds having perfluoroalkyl substituent groups. Another object is to provide intermediates for synthesis of aromatic compounds having perfluoroalkyl groups. Another object is to provide a process for introducing perfluoroalkyl groups into aromatic nuclei. Other objects will become apparent hereinafter.

I have discovered that perfluoroalkylation can be effectively accomplished by heating a mixture of the aromatic starting compound and a perfluoroalkyl monoiodide having 3 to 12 carbon atoms in the molecule, at a temperature in the range of about 200° to 350° C., whereby one or more nuclear hydrogen atoms of the aromatic molecule are replaced by perfluoroalkyl chains having 3 to 12 fully fluorinated carbon atoms.

The process has been found to have general application to a wide variety of aromatic compounds which are stable at the temperature employed, and which contain hydrogen atoms attached to an aromatic nucleus. The process has been found applicable in the case of unsubstituted aromatic compounds, as well as to aromatic compounds having ring substituents; alkyl and other substituents, for example, remaining undisturbed and perfluoroalkylation being confined to hydrogen atoms of the aromatic nucleus, as will be more fully described hereinafter. The process is applicable to polynuclear aromatic compounds, such as naphthalene and polynuclear dyes.

A feature of the process is that commercially useful yields of perfluoroalkylated products can be obtained, having structures corresponding to those of the starting compounds rather than being mere polymeric structures or degradation products.

The process of the invention is of general applicability, and the presence of some secondarily reactive functional groups does not prevent the reactions of the perfluoroalkyl iodide with the nucleus. The perfluoroalkylation reaction, proceeds even though secondary reactions take place which decrease the yield of the desired product, i.e., result in the formation of amounts of side-products in which the substituent group or groups are so altered as not to provide the direct product of the reaction which may be desired. This may be either because the starting compound is unstable at the temperature of the reaction, or because the functional group thereof reacts with the perfluoroalkyl iodide or with iodine even more rapidly than do the available hydrogens of the aromatic nucleus. When perfluoroalkylated products bearing these secondarily reactive substituents are required, they are desirably prepared by indirect routes as more fully explained below.

The terms "aromatic nucleus," "aryl group" and "aromatic compound" are employed herein in reference to substances possessing at least one aromatic group of the type of a benzene ring or a thiophene ring. It is recognized that the sulfur atom in thiophene confers in some respects the properties of a —CH=CH— group in the benzene ring. It is intended that these terms will be understood to embrace substances possessing also a plurality of benzene rings either joined as in biphenyl or fused as in naphthalene, anthracene, naphthacene, etc. There must be at least one available hydrogen atom on a carbon atom of an aromatic ring. The term available hydrogen atom is intended to mean hydrogen on sites in the ring or rings which are capable of accepting free radicals to form adducts as hereinafter described. At the same time, the compound must be substantially stable, even in the presence of iodine, at temperatures in the range of about 200° C. to over about 350° C.

The reaction of the invention appears to be fully as general as the classical reactions of halogenation, sulfonation, nitration and Friedel-Crafts alkylation and it will be recognized that in each case substitution is usually not limited to only one position but may occur in any or even all of the available positions. Thus the reaction is not limited to mono-substitution. In the present reaction it is found that products are usually obtained as mixtures of isomers when such is possible. The reaction proceeds for the most part so as to introduce one perfluoroalkyl group on each available ring in multinuclear compounds before a second perfluoroalkyl group is introduced on any ring but it will be appreciated that this is a tendency rather than an absolute rule. It will also be understood that some multinuclear compounds may possess certain rings which are substantially more hindered for substitution than others and in such cases substitution may be limited to the less hindered rings.

As noted, the aromatic-ring-containing starting materials must be substantially stable under the reaction conditions. A convenient test for stability consists in placing a small quantity of the selected compound in a suitable container, such as a strong glass ampule, or other sealed container, with a few crystals of iodine, and heating to a temperature in the range of about 200° C. to 350° C. Observation of the results will inform those skilled in the art as to the stability of the compound tested. Formation of tars, polymers, decolorization of the iodine, or marked alterations of the physical properties of the compound are indicative of instability. The iodine can be removed from the tested sample if desired by shaking with aqueous sodium thiosulfate solution, thus eliminating the color which might obscure the test results.

The unsubstituted aromatic hydrocarbons are inherently stable under the reaction conditions.

Substituent groups which are substantially stable under the reaction conditions involved in the process of the invention are exemplified by halogens attached to aromatic rings, e.g., fluorine, chlorine, bromine, and iodine; alkyl, aryl and aralkyl groups, e.g., methyl, ethyl, n-butyl, isopropyl, t-butyl, phenyl, tolyl and benzyl groups; perhalogenated alkyl groups when the halogen is fluorine or chlorine, e.g., trichloromethyl, 1,1- and also 1,2-dichlorotrifluoroethyl, perfluoroheptyl, chloro-di-fluoromethyl and trifluoromethyl groups, also the related trichlorosilyl and trifluorosilyl groups; oxygen atoms forming an ether linkage to a methyl or aryl group such as, for example, those in anisole, diphenyl ether or diphenylene oxide, or forming a part of an ester linkage of a perfluorocarboxylic acid or aromatic carboxylic or sulfonic acid such as for example those in phenyl perfluorobutyrate, α-naphthyl trifluoroacetate, p-bromophenyl benzoate, or m-cresyl benzenesulfonate, or in an anhydride such as phthalic anhydride or naphthalic anhydride; sulfur atoms in aromatic sulfides such as diphenylsulfide, trifluoromethyl phenyl sulfide, or bis(p-biphenylyl) sulfide or in heterocyclic rings such as thiophene, thionaphthene, thianthrene and thioindigo; a carbonyl group forming a part of an acid fluoride, cyclic anhydride or cyclic imide or an alkyl, perfluoroalkyl or aryl ketone or polycyclic quinone, or an ester or amide of a perfluoroalkane carboxylic or aromatic acid; a sulfone group ($-SO_2-$) forming part of a sulfonyl fluoride, a cyclic carbosulfonimide, a trifluoromethyl, an aryl or a cyclic sulfone or an aryl sulfonic acid ester or amide. Nitrogen atoms can be present in substituent groups in which at least one of the valences is saturated by an acidic group, e.g., a carbonyl or sulfonyl group, for example, in aromatic carboxylic and perfluorocarboxylic acid amides and imides, aromatic and perfluoroalkane sulfonic acid amides and carbosulfonimides or where it is present in stable multiply-bonded structures such as for example in aromatic nitriles, symmetrical triazines and in copper phthalocyanine.

The reaction is believed to proceed by the formation of free radicals from the thermal dissociation of the perfluoroalkyliodide, thus forming free perfluoroalkyl radicals and iodine atoms. The free radicals first form an adduct with the aromatic ring at the site of an available hydrogen atom. This adduct subsequently is dehydrogenated at this site by combination of the available hydrogen atom with some other component of the system, for example an iodine atom or a perfluoroalkyl radical. The adding radical is thereafter a substituent of the aromatic ring.

The starting materials preferably are free from functional groups containing nitrogen, such as simple primary, secondary and tertiary amine groups, nitroso and nitro groups as well as diazoamino, diazo, hydroxylamine and diazonium groups since these may lead to secondary reactions. Likewise, the starting materials are preferably free from readily oxidizable, reducible, or polymerizable groups, for example, iodoso, iodoxy, hydroxy, phosphino, sulfoxide, disulfide, azido, aldehydo, vinyl and ethynyl groups, and also free acids such as sulfinic, sulfonic, carboxylic, arsonic, boronic and phosphonic acid groups and per-acids such as perbenzoic acid. Solitary non-aromatic halogen atoms as in benzyl chloride may participate to some extent in secondary reactions.

Suitable starting compounds are thus organic aromatic compounds consisting essentially of carbon and at least one element of the group consisting of hydrogen, fluorine, chlorine, bromine, iodine, oxygen, sulfur, nitrogen and silicon; said organic aromatic compounds having at least one aromatic ring and at least one available hydrogen on said ring and being substantially stable to iodine in the temperature range of 200° to 350° C. and said aromatic compounds being free from groups containing active hydrogen and from readily oxidizable, reducible and polymerizable groups and having nitrogen atoms, when present, in substituent groups in which at least one of the valences is saturated by an acidic group.

These substituents introduce instability into the molecule at the temperatures employed in certain cases even when iodine is not present, so that aromatic compounds thus substituted are not substantially stable in the presence of iodine at the temperature employed, i.e., about 200° C. to over 350° C.

It must be recognized, however, that in some cases the addition of perfluoroalkyl groups and decomposition or other undesired reaction may be taking place simultaneously. The rate of perfluoroalkylation may nevertheless be sufficient so that a useful amount of perfluoroalkylated aromatic compound can be recovered from the resulting mixture. The perfluoroalkyl substituents tend to stabilize the desired compounds, so that after substitution they resist degradation and can be isolated by means of relatively drastic methods if necessary. Furthermore, using an excess of the aromatic molecule affords a means for ensuring formation of useful amounts of perfluoroalkyl substituted compounds when competing reactions interfere, as for example, if the iodine produced in the reaction halogenates the aromatic ring and effectively removes it from reaction. Addition of more of the aromatic compound scavenges the iodine in this case.

Although there are thus certain substituent groups which are desirably avoided, just as there are in the aforementioned other general reactions of aromatic compounds, the scope of the process of the invention is still very broad and it is often desirable to use the invention to prepare intermediates from which compounds possessing these groups can be subsequently prepared. For example, a diazonium salt containing a perfluoroalkyl group can be prepared by nitration of the desired perfluoroalkylated aromatic hydrocarbon (or substituted aromatic hydrocarbon) followed by reduction and diazotization. It will be apparent that each of these intermediates is of the type which is not readily prepared directly but that each is readily available by this route.

Those skilled in the art will appreciate that some well-known procedures may require slight modifications because of the different solubilities of the perfluoroalkylated compounds of the invention but that these modifications will cause no inconvenience. As an illustration, extractions normally performed using hydrocarbons, e.g., hexane, will in many cases be more readily effected employing perfluorocarbons such as perfluorooctane and in some cases at least it will be found advantageous to employ highly fluorinated solvents such as trifluoroethanol, methyl perfluorobutyrate and benzotrifluoride as solvents for recrystallization either alone or in admixture with other miscible solvents.

An important feature of my process is that, unlike processes whose practical utility is confined to reactants and products having a single fluorinated carbon atoms (e.g., trifluoromethyl compounds), it has practical utility for making compounds that are provided with fluorocarbon chains containing three or more carbon atoms. There is no falling off in yield with increase in chain length. Perfluoroalkyl chains containing 3 to 12 carbon atoms are of particular interest because their introduction into an aromatic compound has been found practical and greatly modifies the solubility and surface active properties in a useful manner, owing to the hydrophobic and oleophobic properties of the fluorocarbon "tails" thereby provided.

The perfluoroalkylated products of the process are stable, and in general have greater oxidative and chemical stability than the starting compounds. Solubility in oils, hydrocarbon media and common organic solvents is diminished, particularly when one or more perfluoroalkyl groups containing 3 to 12 carbon atoms are incorporated in the molecule so as to obtain a fluorine content of about 50% or higher. Solubility in fluorinated solvents is thereby achieved or enhanced. Products can be obtained which are highly insoluble in water, hydrocarbon, and common organic solvents, but which have significant solubility in fluorocarbon and chlorofluorocarbon type solvents.

Of particular interest because of their novel properties and because they illustrate the versatility of the process, are perfluoroalkylated phthalic anhydride (from which novel and useful alkyd-type resins can be made), and perfluoroalkylated dyestuffs. For example phthalocyanine dyes and pigments can be perfluoroalkylated, e.g., copper phthalocyanine. Dyes and dye-pigments can be made which are compatible with "Teflon" (polytetrafluoroethylene) and can be successfully employed for dyeing and for printing upon this fluorocarbon polymer, which is incompatible with ordinary dyestuffs.

The process of my invention consists of heating a mixture of the aromatic starting compound and a perfluoroalkyl monoiodide having 3 to 12 carbon atoms in the molecule, at a temperature in the range of about 200° C. to 350° C., and recovering the perfluoroalkylated product compound. The reaction is performed in an autoclave or a pressure ampoule owing to the pressure developed.

The following equation shows the reaction in the simplest situation where one nuclear hydrogen atom of the molecule is replaced.

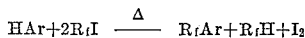

In this equation "Ar" is the residue of the aromatic molecule to which is attached the hydrogen atom that is replaced by the perfluoroalkyl group "$R_f$." This replaced hydrogen atom is directly attached to a carbon atom of an aromatic nucleus and the perfluoroalkyl substituent enters the same position.

The simplest illustration of the process is provided by the reaction of benzene and perfluoropropyl iodide to yield perfluoropropyl benzene (phenylperfluoropropane):

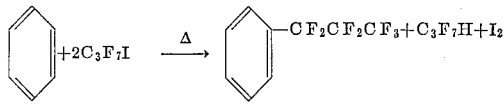

This type of molecule is hydrophobic at both ends and is oleophilic at the benzene end and oleophobic at the fluorocarbon end. It has utility as a surface-active agent, for example in preparing oil-fluorocarbon emulsions, owing to the solubility of one end of the molecule in the oil phase and of the other end in the fluorocarbon phase.

Poly(perfluoroalkyl) substituted aromatic products are normally obtained in small yields as by-products even when equimolar ratios of starting compounds are used. Increased yields thereof can be obtained by increasing the mole ratio of the perfluoroalkyl iodide reactant or by using as a starting compound a perfluoroalkylated aromatic compound that has previously been prepared by the process.

The perfluoroalkyl iodides which may be employed in the process of the invention are acyclic or cyclic compounds having from 3 to 12 carbon atoms. The preferred groups of acyclic compounds are those containing 3 to 12 carbon atoms since the products derived from the perfluoroalkyl iodides possess all the advantages of the trifluoromethyl compounds as regards stability, and additionally show significantly altered solubility properties. Of the cyclic compounds the preferred group is that having from 5 to 12 carbon atoms. Perfluoroalkyl iodides may be prepared readily from any perfluoroalkyl carboxylic acid having one more carbon atom by conversion to the silver salt and reaction with iodine as described in U.S. Patent 2,554,219.

Among the useful perfluoroalkyl iodides, the following are illustrative: perfluoropropyl iodide, perfluorobutyl iodide, perfluoroheptyl iodide, perfluorononyl iodide, perfluoroundecyl iodide, perfluorododecyl iodide, perfluoro-(4-ethylcyclohexyl) iodide, perfluoro(tetrahydrofurfuryl) iodide and the like. It will thus be seen that such perfluoroalkyl iodides comprise perfluorinated radicals of the groups consisting of acyclic perfluorinated monoradicals having from 3 to 12 carbon atoms and cyclic perfluorinated monoradicals having from 5 to 12 carbon atoms.

The poly(perfluoroalkyl) substituted aromatic compounds of the invention are represented by the formula $(R_f)_nAr$ wherein $R_f$ is a perfluoroalkyl radical containing from 3 to 12 carbon atoms. Ar is the n-valent radical of an aromatic nucleus and $n$ is an integer from 1 to the number of available hydrogen atoms of the aromatic nucleus. The preferred class is that group in which $n$ is 1 to 4. It will be understood that the aromatic nucleus which is represented by $ArH_n$ is of the class which are stable at 200° to 350° C. in the presence of iodine and may contain substituent groups as described hereinabove. As pointed out above the multiplicity of perfluoroalkyl groups may be on one or several rings and hence the aromatic nucleus need possess only one ring but may possess several with associated available hydrogen atoms.

The following experimental examples illustrate the process and provide further information on the properties of the subject compounds.

*Example 1*

The reaction vessel was a 180 ml. stainless steel rocking autoclave capped by a 3000 p.s.i. nickle rupture disk. It was charged with 90.0 grams of $n-C_3F_7I$ (normal perfluoropropyl iodide) and 23.4 grams of benzene, providing a 1:1 mole ratio. The autoclave was heated to 250° C. (inside temperature) and shaken for 15 hours; it was then vented and the liquid product was poured off and filtered to remove iodine crystals, resulting in 39.5 grams of crude product. This was treated with mercury to remove traces of free iodine and then distilled through a 10 cm. packed fractionating column.

There was obtained 22.3 grams of relatively pure $C_3F_7C_6H_5$ (perfluoropropyl benzene), having a boiling point of 132° C. (at 760 mm.) and a refractive index (at 25° C.) of 1.3790. Analysis showed 54.1% C. (calc. 54.0%) and 43.9% F. (calc. 43.9%). The yield (based on $C_3F_7I$) was 30%.

The higher boiling fractions (totaling 4.7 grams) were passed through 1.5 ml. of finely divided activated silica gel in 6 mm. I.D. column in order of decreasing boiling points. The first fractions, weighing 1.5 grams (3% yield), consisted of $(C_3F_7)_2C_6H_4$, bis(perfluoropropyl) benzene, as determined by analysis, which showed 34.8% C. (34.8% calc.) and 62.5% F. (64.3% calc.). The refractive index (at 25° C.) was 1.3492. The complexity of the infrared spectrum indicated that an isomeric mixture had been formed.

*Example 2*

By the same procedure, an equimolar mixture of 110.0 grams of $n-C_7F_{15}I$ (normal perfluoroheptyl iodide) and 17.3 grams of benzene were reacted for 15 hours at 250° C.

Perfluoroheptyl benzene, $C_7F_{15}C_6H_5$ was obtained in a yield of 32%. The boiling point was 200° C. (at 760 mm.) and the refractive index (at 25° C.) was 1.3596. Analysis showed 35.0% C. (35.0% calc.) and 64.0% F. (63.9% calc.).

In addition there was obtained a 4% yield of this (perfluoroheptyl)benzene, $(C_7F_{15})_2C_6H_4$, having a boiling point (760 mm.) of 270° C. and a melting point of 88° C. Analysis showed 29.5% C. (calc. 29.5%) and 69.9% F. (calc. 70.1%).

Nitration of the above n-perfluoroheptyl benzene with a mixture of concentrated nitric acid and concentrated sulfuric acid at 80° C. followed by dilution in water produces a mixture of nitro-perfluoroheptyl benzenes in which the meta isomer greatly predominates. The mixture was purified by distillation, whereupon it was found to melt at 39–40° C. B.P. 112–113° C. at 3 mm. of Hg pressure.

*Analysis.*—Calculated for $C_{13}H_4F_{15}NO_2$; 31.8% C., 58.0% F. Found 32.0% C., 58.0% F.

When reduced with hydrogen and Raney nickel catalyst in the usual manner, meta perfluoroheptyl aniline was obtained in 80% yield. B.P., 83–86° C. at 2 mm. of Hg pressure, $n_D^{20}$ 1.3883. It was diazotized in acid solution with nitrous acid and coupled with R salt (sodium salt of 2–hydroxy–3, 6–naphthalene disulfonic acid) to form a dark red azo dye.

*Example 3*

A mixture of 10.0 grams of $n-C_7F_{15}I$ and 0.9 gram of toluene was heated for 14 hours at 290° C. in a heavy-walled 30 ml. "Pyrex" glass ampoule. The resulting reactant product was extracted with $c-C_6F_{12}O$ solvent and the solution was fractionally distilled to provide a product identified as $C_7F_{15}C_7H_7$, which was obtained in yield of 31%. It had a boiling point of 217° C. (at 760 mm.) and a refractive index (at 25° C.) of 1.3678. Analysis showed 36.6% C. (calc. 36.6%) and 62.0% F. (calc. 61.9%). The infrared spectrum indicated nuclear substitution.

*Example 4*

The reaction for 13 hours at 300° C. in a heavy-walled 30 ml. "Pyrex" glass ampoule of 7.4 grams of $n-C_7F_{15}I$ and 3.8 grams of naphthalene yielded a mixture from which the desired product was recovered by Soxhlet extraction with a fluorocarbon solvent (c-$C_6F_{12}O$) followed by vacuum distillation.

This product, perfluoroheptyl naphthalene, $$C_{17}F_{15}C_{10}H_7$$

was obtained in a yield of 31%. The refractive index (at 25° C.) was 1.4160. Analysis showed 42.5% C. (calc. 41.2%) and 58.0% F. (calc. 57.5%).

*Example 5*

The reaction in an ampoule for 20 hours at 300° C. of a mixture of 10.0 grams of n-$C_7F_{15}I$ and 2.1 grams of benzonitrile (phenyl cyanide), $C_6H_5CN$, yielded a mixture from which the desired product was extracted with c-$C_6F_{12}O$ solvent. The product (a mixture of isomers) was purified by vacuum sublimation.

This product, perfluoroheptyl benzonitrile, $$C_7F_{15}C_6H_4CN$$

was obtained in a yield of 26%. It had a boiling point of 254° C. (at 760 mm.) and a melting range of 45–52° C. Analysis showed 2.94% N (calc. 2.97) and 35.7% C. (calc. 35.7%).

*Example 6*

The reaction in an ampoule for 13 hours at 300° C. of a mixture of 10.0 grams of n-$C_7F_{15}I$ and 3.2 grams of bromobenzene $C_6H_5Br$, yielded a mixture which was extracted with c-$C_6F_{12}O$ solvent and fractionally distilled.

A 30% yield was obtained of perfluoroheptyl bromobenzene, $C_7F_{15}C_6H_4Br$, having a boiling point (at 760 mm.) of 237° C. and a refractive index (at 25° C.) of 1.3870. Analysis showed 29.2% (calc. 29.8%) and 14.9% Br (calc. 15.2%).

A mixture of 25 grams of m-perfluoroheptyl bromobenzene and 35 grams of copper powder was heated at reflux temperatures, for 23 days and cooled. The pot temperature rose from 240° to 350° during this time. The residue in the reflux flask was taken up in ether. 3,3'-di(perfluoroheptyl) biphenyl is obtained as crystals, melting point 51°, by distillation at 105°/0.05 mm. Hg. Analysis showed 35.4% C (calc. 35.1%) and 63.2% F., (calc. 64.0%).

*Example 7*

In similar fashion iodobenzene was reacted with $$n\text{-}C_7F_{15}I$$

to obtain a 38% yield of perfluoroheptyl iodobenzene, $C_7F_{15}C_6H_4I$, having a boiling point (at 760 mm.) of 253° C. and a refractive index of 1.4152. Analysis showed 27.1% C (calc. 27.5%), 22.8% I (calc. 22.5%) and 49.4% F. (calc. 50.1%).

Fluorobenzene and chlorobenzene are found to be perfluoroalkylated by the same procedure to produce perfluoroheptyl fluorobenzene and perfluoroheptyl chlorobenzene respectively.

Additional examples typical of the process of the invention are shown in Table I, in which the aromatic compounds and perfluoroalkyl iodides employed are shown by formulae together with the formulae of the products obtained. The number of moles of the perfluoroalkyl iodide used for each mole of aromatic reactant is set forth under each perfluoroalkyl iodide. In each case, the perfluoroalkyl iodide is reacted in a sealed ampoule at about 250° C. to 300° C. for about 15 hours with the aromatic compound. The procedure of workup is that described above, but alternatively may be modified as shown hereinafter in Example 77.

TABLE I

| Ex. | Aromatic compound employed | Perfluoroalkyl iodide employed | Product |
|---|---|---|---|
| 8 | t-$C_4H_9C_6H_5$ | $C_3F_7I$, 2.2 | t-$C_4H_9$—$C_6H_4$—$C_3F_7$ |
| 9 | $C_6H_5$—$C_6H_5$ | $C_7F_{15}I$, 2.0 | $C_7F_{15}$—$C_6H_4$—$C_6H_5$ |
| 10 | $C_6H_5$—$CH_2$—$C_6H_5$ | $C_3F_7I$, 5.0 | $(C_3F_7$—$C_6H_4)_2CH_2$ |
| 11 | $C_6H_5$—$CF_3$ | $C_3F_7I$, 4.4 | $(C_3F_7)_2C_6H_3$—$CF_3$ |
| 12 | $C_6H_5$—$CCl_2$—$CF_3$ | $C_9F_{19}I$, 2.2 | $C_9F_{19}$—$C_6H_4$—$CCl_2$—$CF_3$ |
| 13 | $C_6H_4(OCH_3)_2$(m) | $C_7F_{15}I$, 2.2 | $C_7F_{15}$—$C_6H_3(OCH_3)_2$ |
| 14 | $C_6H_5$—$SiCl_3$ | $C_9F_{19}I$, 2.0 | $C_9F_{19}$—$C_6H_4$—$SiCl_3$ |
| 15 | $C_6H_5$—$SiF_3$ | $C_7F_{15}I$, 2.0 | $C_7F_{15}$—$C_6H_4$—$SiF_3$ |
| 16 | $C_6H_5$—O—$C_6H_5$ | $C_3F_7I$, 6.0 | $(C_3F_7$—$C_6H_4)_2O$ |
| 17 | $CH_3$—$C_6H_4$—$SO_3$—$C_4H_9$ | $C_3F_7I$, 1.5 | $(Cl_3)(C_3F_7)C_6H_3$—$SO_3C_4H_9$ |
| 18 | $CH_3$—O—CO—$C_6H_5$ | $C_7F_{15}I$, 2.5 | $CH_3$—O—CO—$C_6H_4$—$C_7F_{15}$ |
| 19 | $C_6H_5$—O—CO—$C_3F_7$ | $C_3F_7I$, 2.2 | $C_3F_7$—$C_6H_4$—O—CO—$C_3F_7$ |
| 20 | $C_6H_5$—O—CO—$C_6H_4$—$OCH_3$ | $C_3F_7I$, 4.4 | $C_3F_7C_6H_4$—O—$\overset{\overset{O}{\|}}{C}$—$\overset{\|}{C_6H_3}$—$C_3F_7$ ; $CH_3O$— |
| 21 | $(C_6H_5)_2S$ | $C_3F_7I$, 4.5 | $(C_3F_7$—$C_6H_4)_2S$ |
| 22 | $C_6H_5S$—$C_7F_{15}$ | $C_3F_7I$, 2.2 | $C_3F_7$—$C_6H_4$—S—$C_7F_{15}$ |
| 23 | $C_6H_5$—COF | $C_7F_{15}I$, 7.0 | $(C_7F_{15}$—$)_3$—$C_6H_2COF$ |
| 24 | $C_6H_5$—NH—CO—$CH_3$ | $C_7F_{15}I$, 2.2 | $C_7F_{15}$—$C_6H_4$—NH—CO—$CH_3$ |
| 25 | Phthalimide | $C_7F_{15}I$, 2.2 | $C_7F_{15}$—$C_6H_3(CO)_2NH$ |
| 26 | $C_6H_5$—CO—$CH_3$ | $C_7F_{15}I$, 2.5 | $C_7F_{15}$—$C_6H_4$—$COCH_3$ |
| 27 | $(C_6H_5)_2$—CO | $C_3F_7I$, 4.3 | $(C_3F_7$—$C_6H_5)_2CO$ |
| 28 | $C_6H_5$—CO—$CF_3$ | $C_3F_7I$, 2.2 | $C_3F_7$—$C_6H_4$—CO—$CF_3$ |
| 29 | Anthraquinone | $C_3F_7I$, 2.2 | $C_3F_7$—$C_{14}H_7O_2$ |
| 30 | $C_6H_5$—CO—$N(CH_3)_2$ | $C_3F_7I$, 2.0 | $C_3F_7$—$C_6H_4$—CO—$N(CH_3)_2$ |
| 31 | p-$CH_3$—$C_6H_4SO_2F$ | $C_9F_{19}I$, 2.2 | $(CH_3)(C_9F_{19})C_6H_3SO_2F$ |
| 32 | $C_6H_4(CO)(SO_2)NH$ | $C_3F_7I$, 2.4 | $C_3F_7$—$C_6H_3(CO)(SO_2)NH$ |
| 33 | $C_6H_5$—$SO_2C_8F_{17}$ | $C_3F_7I$, 2.1 | $C_3F_7$—$C_6H_4$—$SO_2C_8F_{17}$ |
| 34 | $(C_6H_5)_2SO_2$ | $C_7F_{15}I$, 2.2 | $C_7F_{15}$—$C_6H_4$—$SO_2$—$C_6H_5$ |
| 35 | Diphenylene sulfone | $C_7F_{15}I$, 4.8 | $(C_7F_{15}$—$C_6H_3)_2SO_2$ |
| 36 | $CH_3$—$C_6H_4$—$SO_2$—$N(C_2H_5)_2$ | $C_3F_7I$, 2.2 | $(CH_3)(C_3F_7)C_6H_3$—$\underset{\underset{N(C_2H_5)_2}{\|}}{SO_2}$ |
| 37 | $C_6H_5POCl_2$ | $C_3F_7I$, 2.3 | $C_3F_7$—$C_6H_4$—$POCl_2$ |
| 38 | $C_6H_6$ | $C_{11}F_{23}I$, 2.2 | $C_{11}F_{23}C_6H_5$ |
| 39 | $C_6H_6$ | $C_2F_5C_6F_{10}I$, 2.2 | $C_2F_5$—$C_6F_{10}C_6H_5$ |
| 40 | $C_6H_6$ | $\begin{matrix}F_2C\text{—}CF_2\\ \| \quad\quad \|\\ F_2C\quad CF\text{—}CF_2I, 2.2\\ \diagdown\;\diagup\\ O\end{matrix}$ | $C_5OF_9$—$C_6H_5$ |
| 41 | $C_6H_5C_6H_{13}$ | $C_3F_7I$, 8.5 | $C_6H(C_6H_{13})(C_3F_7)_4$ |
| 42 | Thiophene | $C_7F_{15}I$, 2.2 | $C_7F_{15}$—$C_4H_3S$ |
| 43 | $CH_3$—$C_4H_3S$ | $C_7F_{15}I$, 2.2 | $C_7F_{15}$—$C_4H_2S$—$CH_3$ |
| 44 | o-$C_6H_4(CN)_2$ | $C_7F_{15}I$, 2.6 | $C_7F_{15}C_6H_3(CN)_2$ |

| Ex. | Aromatic compound employed | Perfluoroalkyl iodide employed | Product |
|---|---|---|---|
| 45 | o-$C_6H_4Cl_2$ | $C_3F_7I$, 7.5 | $C_6Cl_2H(C_3F_7)_3$ |
| 46 | p-$C_6H_4Cl_2$ | $C_7F_{15}I$, 5.0 | $C_6H_2Cl_2(C_7F_{15})_2$ |
| 47 | p-Cl—$C_6H_4$—I | $C_7F_{15}I$, 3.0 | $C_6H_3ICl$—$C_7F_{15}$ |
| 48 | p-F—$C_6H_4$—Br | $C_3F_7I$, 2.2 | $C_3F_7$—$C_6H_3BrF$ |
| 49 | 1,3,5-$Br_3C_6H_3$ | $C_9F_{19}I$, 2.3 | $Br_3C_6H_2$—$C_9F_{19}$ |
| 50 | 1,2,4,5-$Cl_4C_6H_2$ | $C_3F_7I$, 2.5 | $C_6H_2Cl_4$—$C_3F_7$ |
| 51 | $C_6HCl_5$ | $C_{11}F_{23}I$, 2.1 | $C_6Cl_5C_{11}F_{23}$ |
| 52 | 2,4-$Br_2C_6F_3$—$CH_3$ | $C_7F_{15}I$, 2.6 | $Br_2C_6H_2$—$C_7F_{15}$ |
| 53 | o,o'-$FC_6H_4$—$C_6H_4F$ | $C_3F_7I$, 7.1 | $(C_3F_7)_2FC_6H_2$—$C_6H_3F$—$(C_3F_7)$ |
| 54 | p,p'-$(ClC_6H_4)_2$ | $C_3F_7I$, 4.8 | $C_3F_7$—$ClC_6H_3$—$C_6H_3Cl$—$C_3F_7$ |
| 55 | p-F—$C_6H_4$—$CH_3$ | $C_7F_{15}I$, 2.5 | $C_7F_{15}$—$C_6H_3F$—$CH_3$ |
| 56 | m-Vr—$C_6H_4$—$CF_3$ | $C_7F_{15}I$, 2.5 | $C_7F_{15}$—$C_6H_3$—Br—$CF_3$ |
| 57 | m-Br—$C_6H_4$—$C_7F_{15}$ | $C_3F_7I$, 2.5 | $C_3F_7$—$C_6H_3Br$—$C_7F_{15}$ |
| 58 | m-$(CF_3)_2C_6H_4$ | $C_3F_7I$, 2.2 | $(CF_3)_2C_6H_3$—$C_3F_7$ |
| 59 | p-$(CF_3)_2C_6H_4$ | $C_3F_7I$, 2.2 | $(CF_3)_2C_6H_3$—$C_3F_7$ |
| 60 | m-$CF_3$—$C_6H_4$—$OCH_3$ | $C_3F_7I$, 2.2 | $CF_3C_6H_3(OCH_3)$—$C_3F_7$ |
| 61 | m-$(CH_3)_2C_6H_4$ | $C_3F_7I$, 4.5 | $(CH_3)_2C_6H_2(C_3F_7)_2$ |
| 62 | $CH_3$—$C_6H_4$—$SiCl_3$ | $C_7F_{15}I$, 2.2 | $CH_3$—$(C_7F_{15})C_6H_3$—$SiCl_3$ |
| 63 | m-$(CCl_3)_2 C_6H_4$ | $C_7F_{15}I$, 2.2 | $(CCl_3)_2 C_6H_3$—$C_7F_{15}$ |
| 64 | p,p'-$(CF_3$—$C_6H_4)_2$ | $C_3F_7I$, 5.0 | $(CF_3(C_3F_7)C_6H_3)_2$ |
| 65 | p-Cl—$C_6H_4$—COCl | $C_7F_{15}I$, 2.1 | $C_7F_{15}$—$C_6H_3Cl$—COCl |
| 66 | p,p'-(Br—$C_6H_4)_2$—CO | $C_3F_7I$, 4.9 | $(C_3F_7$—$BrC_6H_3)_2CO$ |
| 67 | m-$C_6H_4(CN)_2$ | $C_7F_{16}I$, 4.7 | $(C_7F_{15})_2C_6H_2(CN)_2$ |
| 68 | p-$C_6H_4(CN)_2$ | $C_{11}F_{23}I$, 2.1 | $C_{11}F_{23}$—$C_6H_3(CN)_2$ |
| 69 | Pyromellitic dianhydride | $C_7F_{15}I$, 2.1 | $C_7F_{15}$—$C_6H$—$((CO)_2O)_2$ |
| 70 | m-$CF_3$—$C_6H_3$—$N(CO)_2$—$C_6H_4$ | $C_3F_7I$, 5.6 | $C_3F_7$—$CF_3C_6H_3$—$N(CO)_2C_6H_3, C_3F_7$ |
| 71 | α-$C_{10}H_7F$ | $C_3F_7I$, 5.0 | $(C_3F_7)_2C_{10}H_5F$ |
| 72 | β-$C_{10}H_7Br$ | $C_3F_7I$, 5.0 | $(C_3F_7)_2C_{10}H_5Br$ |
| 73 | 1,5-$C_{10}H_6Cl_2$ | $C_7F_{15}I$, 4.8 | $(C_7F_{15})_2C_{10}H_4Cl_2$ |
| 74 | α-$C_{10}H_7CN$ | $C_7F_{15}I$, 5.0 | $(C_7F_{15})_2 C_{10}H_5CN$ |
| 75 | β-$C_{10}H_7SO_2F$ | $C_3F_7I$, 6.8 | $(C_3F_7)_3C_{10}H_4SO_2F$ |
| 76 | Pyrene | $C_3F_7$, 9.0 | $(C_3F_7)_4C_{16}H_6$ |

*Example 77*

The reaction in an ampoule for 14 hours at 320° C. of a mixture of 10.0 grams of n-$C_7F_{15}I$ and 1.5 grams of phthalic anhydride (mole ratio 2:1), yielded a mixture which was worked up by Soxhlet-type extraction with hot c-$C_6F_{12}O$ solvent. A brown oily solid separated on cooling. This was placed in a glass tube of 16 mm. inside diameter and 35 cm. long, sealed at one end, and the open end was connected to a vacuum (oil rotary) pump. Sublimation occurred at 150° C. and 0.01 mm. pressure to yield 3.7 grams of colorless but somewhat damp crystals, presumably a mixture of isomers since only one fraction of sublimate was noted. This product was recrystallized twice from c-$C_8F_{16}O$ and solvent and resublimed to convert any acid back to the anhydride.

The product was obtained in a yield of 36% and was identified as pure perfluoroheptyl phthalic anhydride. $C_7F_{15}C_6H_3(CO)_2O$. It melted at 121–124° C. The infrared spectrum showed the pair of bands characteristic of an anhydride of a carboxylic acid. Analysis showed 35.0% C. (calc. 34.9%) and 55.1% F. (calc. 55.2%). The saponification equivalent was 258–268 (calc. value 258).

By the same procedure perfluorononyl iodide is reacted with phthalic anhydride to produce perfluorononyl phthalic anhydride melting at 131° to 133° C. The infrared spectrum showed the pair of bands characteristic of an anhydride of a carboxylic acid.

The use of perfluoroalkylated phthalic anhydrides for making fluorinated alkyd resins is illustrated by the following experiment: A mixture of perfluoroheptyl phthalic anhydride and glycerol in 3:2 mole ratio was heated for four hours at 200–220° C., resulting in a resin product having varnish-like properties. It was insoluble in hydrocarbon solvents but readily soluble in c-$C_6F_{12}O$. A solution coated on glass dried to a clear, amber, rather brittle film, showing fairly good adherence to glass. The film was both oleophobic and hydrophobic. Heating of the film at 220° C. for several hours rendered it more insoluble, harder, and more brittle. The film survived heating to 324° C. and its adherence improved. It remained shiny and clear although some volatile material was evolved during heating. These properties suggest utility as an oil-proof insulating varnish for electrical wires and conductors intended for high temperature usage.

PERFLUOROALKYLATED DYES

The perfluoroalkyl phthalic anhydrides are also important intermediates since they are employed for the preparation of phthalein dyes, e.g., perfluoroheptyl phenol-phthalein, perfluoroheptyl fluorescein etc., and can further be reacted with benzene and simple substituted derivatives thereof to produce, e.g., o-benzoyl-perfluoroheptyl benzoic acid which is then subsequently cyclized to produce, e.g., perfluoroheptylanthraquinone.

Instead of phthalic anhydride, phthalonitrile is similarly perfluoroalkylated and is then used in conventional phthalocyanine synthesis to produce perfluoroalkylated phthalocyanines.

Condensation of perfluoroalkylated phthalic anhydrides with m-diethylamino phenol and quinaldines respectively produces perfluoroalkylated rhodamines and quinophthalines. Benzotrichloride is perfluoropropylated by the procedure used for benzotrifluoride in Example 11 to give bis(perfluoropropyl) benzotrichloride or with half the quantity of perfluoropropyl iodide to give perfluoropropyl-benzotrichloride both of which compounds are converted to rhodamines.

Many other perfluoroalkylated dyes will be seen to be readily producible employing other intermediates available by the process of the invention for example by nitration, halogenation, sulfonation, reduction, oxidation, esterification, hydroxylation and other well known reactions. The following examples particularly illustrate dyestuffs which are directly perfluoroalkylated.

*Example 78*

This example illustrates the preparation of perfluoroalkylated copper phthalocyanine. The parent compound is often referred to as a dye but is more properly regarded as a pigment because it is essentially insoluble in all solvents. It is highly stable and sublimes in high vacuum without decomposition at 550° C.

The introduction of four —$C_7F_{15}$ chains in the molecule, providing four fluorocarbon "tails," results in a stable derivative dye that is quite soluble in fluorinated solvents but which remains highly insoluble in non-fluorinated solvents. Strongly blue solutions are readily prepared at room temperature in c-$C_8F_{16}O$, c-$C_6F_{12}O$, $(C_6F_{13})_2O$, $(C_4F_9)_3N$, $CF_3C_6H_5$ and $CFCl_2 \cdot CFCl_2$, but no color is detected in non-fluorinated liquids as illustrated by $C_6H_6$, $C_7H_{16}$, $(CH_3)_2CO$, $C_2H_5OH$, $H_2O$, $CCl_4$ and $CHCl:CCl_2$.

The experimental procedure was as follows: A 30 ml. heavy-walled glass ampoule was charged with 1.4 grams of copper phthalocyanine ("Monastral" Blue) and 10.0 grams of n-$C_7F_{15}I$ (mole ratio of 1:8), and was sealed off in vacuum. The ampoule was heated at 330° C. for 14 hours. The reaction product was subjected to Soxhlet extraction with c-$C_6F_{12}O$ solvent, resulting in an intensely blue solution from which, after filtration, the solvent was removed by boiling, leaving 2.7 grams of dark blue-black powder. The filtration residue was subjected to a further Soxhlet extraction with benzotrifluoride solvent ($CF_3C_6H_5$) and the filtered solution was boiled to dryness to provide a further 1.7 grams of product.

Analysis demonstrated that both product materials consisted mainly of tetraperfluoroheptyl copper phthalocyanine, having the empirical formula:

$$C_{60}F_{60}H_{12}N_8Cu$$

This compound contains 55.7% F. Purity calculations based on nitrogen percentage indicated that the materials were of 75% and 85% purities, respectively.

Visible spectroscopy of the product in c-$C_8F_{17}O$ solvent gave a peak absorption of 6160 A. Taking the molecular weight as that calculated for the pure compound, the molar extinction coefficient is about 30,000.

The perfluoroalkyl-substituted dye was readily purified by vacuum sublimation. The perfluoroalkylated dye melts at about 300° C. but does not volatilize appreciably even in vacuum at temperatures up to 350° C., while the impurities present are removed by this procedure.

The purified product had principal visible absorption wave lengths at 6550–6590 A. and 6200 A. when dissolved in c-$C_8F_{16}O$ solvent (concentration of 0.070 gram/liter). The corresponding absorption wave lengths of the parent copper phthalocyanine are at 6700 A. and 6400 (supersaturated solution in xylene). Perfluoroalkylation thus resulted in a "blue shift" of absorption, that is, a definite displacement of absorption toward higher frequencies (shorter wave lengths).

Concentrated sulfuric acid dissolves the parent compound, which can be regenerated by addition of water. The tetraperfluoroheptyl derivative reacts with sulfuric acid but the product is not soluble in sulfuric acid or in fluorocarbons and exists as a third phase when the solution is mixed with fluorocarbon solvent; however, addition of water regenerates the blue dye.

*Example 79*

These experiments illustrate the perfluoroalkylation of vat dyes to obtain useful dyes containing at least about 50% fluorine and which have been solubilized in respect to fluorinated solvents but are insoluble in hydrocarbons and in water.

Thioindigo, Color Index 1207, ("Ciba" Pink B), and n-$C_7F_{15}I$, in a mole ratio of 1:4, were heated in an ampoule for 2.5 hours at 330° C. The product was subjected to Soxhlet extraction with c-$C_6F_{12}O$ solvent and the solution was heated to boil off the solvent. The residue was purified by sublimation at 250° C. in a 0.01 mm. vacuum. The purified product was soluble in c-$C_8F_{16}O$ solvent, giving a red color. The principal visible absorption wave length was at 5140 A., in contrast to 5400 A. for the parent compound.

The same procedure was used to react pyranthrone, Color Index 1096, ("Ponsol" Golden Orange G), with n-$C_7F_{15}I$ in a mole ratio of 1 to 5.4 (heating for 6 hours at 340° C.) and to recover the purified product. The product dye was yellow and was soluble in c-$C_8F_{16}O$ solvent. The principal visible absorption wave length was at 4120 A., in contrast to principal absorption wave lengths of 4720, 4400 and 4140 A. for the parent compound.

Reaction of violanthrone, Color Index 1099, ("Cibanone" Dark Blue BO), with n-$C_7F_{15}I$, in 1:5.9 mole ratio, yielded a red dye soluble in c-$C_8F_{16}O$. The principal visible absorption wave length was at 5050 A. in contrast to 5870 A. for the parent compound.

Reaction of dichloro iso-violanthrone, Color Index 1104, ("Cibanone" Violet 4R), with n-$C_7F_{15}I$, in a 1:6.8 mole ratio, yielded a violet dye soluble in c-$C_8F_{16}O$. The principal visible absorption wave length was at 5350 A. in contrast to 5780 A. for the parent compound.

Similar procedures are employed for the perfluoroalkylation of anthanthrones having no interfering groups.

The foregoing examples of perfluoroalkylated dye-stuffs have been used to dye polytetrafluoroethylene resin successfully, giving clear or translucent colors of excellent thermal stability. A uniformly colored polytetrafluoroethylene product can be obtained either by incorporating the dye in the original molding powder or by applying a solution coating to the surface of a film. In order to fix the dye in the resin it is necessary to heat the latter to its transition temperature (324° C.), at which temperature it becomes able to absorb the dye. At and above this temperature the perfluoroalkylated dye is rapidly absorbed, and a coating on the surface of a film often penetrates to depths greater than 1/10 mm.

The dyes have also been used successfully for printing on polytetrafluoroethylene films, the dye being dissolved in a fluorocarbon type solvent such as c-$C_6F_{12}O$ or $$(C_4F_9)_3N$$

or a mixture thereof, to provide the ink. The film is heated to the transition temperature to cause the dye to penetrate into the film. The markings are clear, legible and permanent. Instead of heating the film, use can be made of heated type maintained at around 350° C. The film is given a uniform coating of dye followed by contact with the heated type which causes the dye to become fixed at the contact areas, the remaining dye being subsequently washed off with solvent. Another expedient is to interpose between the heated type and the film a thin sheet material coated with the dye; pressure of the heated type causing the dye to migrate into the film.

What is claimed is:

1. Tetraperfluoroheptyl copper phthalocyanine.
2. Perfluoroalkylated copper phthalocyanine having four like nuclear-attached perfluoroalkyl chains that contain 3 to 12 carbon atoms each, which is soluble in fluorinated solvents forming strongly blue solutions.
3. A compound of the formula

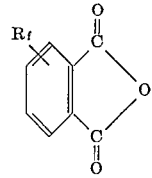

wherein $R_f$ is perfluoroalkyl of 3 to 12 carbon atoms.

4. A compound according to claim 3 wherein the perfluoroalkyl group is perfluoroheptyl.
5. A compound according to claim 3 wherein the perfluoroalkyl group is perfluorononyl.
6. A process for producing a perfluoroalkylated organic compound which comprises
    A. heating at a temperature in the range of about 200° to about 350° C. under autogenous pressure, a mixture of
        I. a perfluoroalkyl monoiodide having 3 to 12 carbon atoms in the molecule with
        II. an organic aromatic compound consisting essentially of carbon and at least one element of the group consisting of hydrogen, fluorine, chlorine, bromine, iodine, oxygen, sulfur, nitrogen and silicon; said organic aromatic compound having at least one aromatic ring and at least one available hydrogen on said ring and being substantially stable to iodine in the temperature range of 200° to 350° C. and said aromatic compound being free from groups containing active hydrogen and from readily oxidizable, reducible and polymerizable groups and having nitrogen atoms, when present, in substituent groups in which at least one of the valences is saturated by an acidic group, and B. recovering from the reaction product, a perfluoroalkylated aromatic organic compound.

7. A process according to claim 6 wherein copper phthalocyanine dye is employed as a starting compound.

8. A process according to claim 6 wherein a vat dye is employed as the starting material.

9. A process of perfluoroalkylating aromatic starting compounds, which comprises reacting copper pthalocyanine with a perfluoroalkyl monoiodide having 3 to 12 carbon atoms in the molecule, at a temperature in the range of about 200 to 350° C. under autogenous pressure to obtain a perfluoroalkylated copper phthalocyanine.

10. A process of perfluoroalkylating aromatic starting compounds, which comprises reacting phthalic anhydride with a perfluoroalkyl monoiodide having 3 to 12 carbon atoms in the molecule, at a temperature of about 200 to 350° C. under autogenous pressure to obtain a perfluoroalkylated phthalic anhydride.

References Cited by the Examiner

UNITED STATES PATENTS

| 2,465,900 | 3/1949 | McBee et al. | 260—651 |
| 2,639,299 | 5/1953 | McBee | 260—651 |
| 2,957,031 | 10/1960 | Drysdale | 260—649 |
| 3,052,691 | 9/1962 | Krespan | 260—327 |

OTHER REFERENCES

McKee: Abstract of U.S. Application Serial No. 614,821, filed Sept. 6, 1945, and published April 11, 1959, 633 O.G. 637.

Pierce et al.: Chemical Abstracts, vol. 49 (1955), pp. 1543–1546.

McBee: Indust. and Eng. Chem., vol. 39 (1947), pp. 236, 237 and 399–401.

Simons: Indust. and Eng. Chem. vol. 39 (1947), p. 239.

WALTER A. MODANCE, *Primary Examiner.*

IRVING MARCUS, NICHOLAS S. RIZZO, *Examiners.*

JOHN D. RANDOLPH, J. A. PATTEN,
*Assistant Examiners.*